US011915595B2

(12) United States Patent
Tomita et al.

(10) Patent No.: US 11,915,595 B2
(45) Date of Patent: Feb. 27, 2024

(54) COLLISION-AVOIDANCE MANEUVERING METHOD IN CONGESTED WATER AND COLLISION-AVOIDANCE MANEUVERING SYSTEM FOR SINGLE-PROPELLER TWIN-RUDDER SHIP

(71) Applicant: JAPAN HAMWORTHY & CO., LTD., Osaka (JP)

(72) Inventors: Kazushi Tomita, Osaka (JP); Hirotaka Yamamoto, Osaka (JP)

(73) Assignee: JAPAN HAMWORTHY & CO., LTD., Osaka (JP)

(*) Notice: Subject to any disclaimer, the term of this patent is extended or adjusted under 35 U.S.C. 154(b) by 599 days.

(21) Appl. No.: 17/054,553

(22) PCT Filed: Nov. 21, 2019

(86) PCT No.: PCT/JP2019/045627
§ 371 (c)(1),
(2) Date: Nov. 11, 2020

(87) PCT Pub. No.: WO2020/183804
PCT Pub. Date: Sep. 17, 2020

(65) Prior Publication Data

US 2021/0248912 A1 Aug. 12, 2021

(30) Foreign Application Priority Data

Mar. 14, 2019 (JP) ................................ 2019-046576

(51) Int. Cl.
*G08G 3/02* (2006.01)
*B63B 43/18* (2006.01)
(Continued)

(52) U.S. Cl.
CPC ............... *G08G 3/02* (2013.01); *B63B 43/18* (2013.01); *B63H 25/06* (2013.01); *B63H 25/50* (2013.01)

(58) Field of Classification Search
CPC ........... G08G 3/02; B63B 43/18; B63H 25/06
See application file for complete search history.

(56) References Cited

U.S. PATENT DOCUMENTS

2004/0163579 A1* 8/2004 Tomita .................. B63H 25/38 114/163
2013/0291775 A1* 11/2013 Wobben .................. B63H 9/02 114/39.3

(Continued)

FOREIGN PATENT DOCUMENTS

JP 7-52887 A 2/1995
JP H09-39894 A 2/1997

(Continued)

OTHER PUBLICATIONS

Extended European Search Report dated Apr. 12, 2022 in corresponding EP Patent Appl. No. 19919293.1.

(Continued)

*Primary Examiner* — Geepy Pe
*Assistant Examiner* — Clint Pham
(74) *Attorney, Agent, or Firm* — KUSNER & JAFFE

(57) ABSTRACT

In collision-avoidance maneuvering in congested waters, an own ship is decelerated by astern power. The own ship is continuously navigated on a current target course with a propulsion propeller always rotated forward at the stern of the own ship. The astern power is generated as the propulsion of a propeller slipstream with rudder angles formed at a pair of right and left high-lift rudders disposed behind the propulsion propeller. In the decelerating maneuvering, the rudder angles formed at the high-lift rudders are controlled within a range from a rudder angle for applying a maximum (Continued)

propeller slipstream as the astern power to a rudder angle for eliminating the ahead power of the propeller slipstream, and the deceleration of the own ship is controlled by changing the astern power according to the rudder angles.

9 Claims, 9 Drawing Sheets

(51) Int. Cl.
*B63H 25/06* (2006.01)
*B63H 25/50* (2006.01)

(56) References Cited

U.S. PATENT DOCUMENTS

| | | | | |
|---|---|---|---|---|
| 2014/0180566 | A1* | 6/2014 | Malhotra | G08G 3/02 340/984 |
| 2017/0067984 | A1* | 3/2017 | Nakahama | G01S 7/10 |
| 2017/0284808 | A1* | 10/2017 | Saito | B63B 49/00 |

FOREIGN PATENT DOCUMENTS

| | | | |
|---|---|---|---|
| JP | 2003-026096 | A | 1/2003 |
| JP | 4055915 | B2 | 12/2007 |
| JP | 2010-162965 | A | 7/2010 |
| JP | 2014-118059 | A | 6/2014 |
| JP | 3201225 | U | 11/2015 |
| JP | 2017-052297 | A | 3/2017 |
| JP | 2018-103816 | A | 7/2018 |
| JP | 2018-103949 | A | 7/2018 |

OTHER PUBLICATIONS

Office Action (and its English-language machine translation) dated Jun. 18, 2019 in corresponding JP Patent Appl. No. 2019-046576.

International Search Report from corresponding International Patent Application No. PCT/JP2019/045627, dated Dec. 24, 2019.

* cited by examiner

COLLISION-AVOIDANCE MANEUVERING METHOD IN CONGESTED WATER AND COLLISION-AVOIDANCE MANEUVERING SYSTEM FOR SINGLE-PROPELLER TWIN-RUDDER SHIP

FIELD OF THE INVENTION

The present invention relates to a collision-avoidance maneuvering method in congested waters and a collision-avoidance maneuvering system for a single-propeller twin-rudder ship, and further relates to a collision avoidance technique.

BACKGROUND OF THE INVENTION

The International Maritime Organization (IMO) has determined a ship's routing as follows:

An object of ship's routing is "to improve the safety of navigation in converging areas and in area where the density of traffic is great or where freedom of movement of shipping is inhibited by restricted sea-room, the existence of obstructions to navigation, limited depths or unfavorable meteorological conditions".

In the present invention, areas defined by the IMO will be collectively referred to as congested waters.

In Japan, the Prevention of Collision at Sea Law has been enacted as a law for preventing collisions between ships. The law concerns traffic rules for ships. For example, as navigation of crossing ships, the law requires that if two ships crossing a course may collide with each other, one of the ships should avoid the other ship on the starboard side. As navigation of meeting, the law requires that if two meeting ships may collide with each other, the ships should pass on the port side.

As a technique for automatically maneuvering ships in compliance with the law and regulations, for example, an automatic collision-prevention support device is described in a Japanese patent publication (Patent No. 4055915).

The device is installed with a radar in a ship and includes another ship detector that detects, from video information acquired by the radar, the length, course, and speed of another ship around the own ship, a stopping performance calculator that calculates stopping performance based on the speed of the other ship relative to the own ship and the detected length of the other ship, the speed being detected by the other ship detector, a dangerous area calculator that determines, based on the calculated stopping performance and the characteristics of the navigation area of the own ship, a dangerous area where the own ship may collide with the other ship, and a display that displays the determined dangerous area.

Moreover, as a technique for applying a braking force to a ship, an emergency maneuvering method for a ship is described in a Japanese patent publication (Japanese Patent Laid-Open No. 7-52887). In this method, an emergency steering device is started in emergency so as to control a rudder controller placed on a higher priority than any normal steering mode, forming a rudder angle for providing two high-lift rudders with a maximum propeller slipstream as astern power. The astern power leads to astern power to the ship against an inertial force applied in the longitudinal direction of the ship, thereby urgently stopping the ship or urgently moving the ship astern. In a state where a propeller propulsion unit is operated forward in a single direction, astern power can be immediately obtained, stopping or moving a ship astern with little trouble at a short distance in a short time. However, the magnitude of a braking force is not controlled in this method.

Moreover, a propulsion system provided with two high-lift rudders is described in a Japanese patent publication (Japanese Patent Laid-Open No. 20189-103816).

In the propulsion system, two high-lift rudders can turn outboard (to the outside) by 105° and turn inboard (to the inside) by 35°. A propeller of a single-engine, single-shaft type operates a pair of independent high-lift rudders at various angles while rotating forward. A propeller slipstream is distributed in a desired target direction by changing combinations of the rudder angles of the rudders. The propeller slipstream is controlled so as to maneuver the ship forward and backward, stop the ship, turn the ship forward, and turn the ship backward.

In the propulsion system, the propulsion of the ship in a target propulsive direction is minutely controlled in a continuous manner from a maximum ahead speed to a maximum astern speed. However, a braking force is not applied opposite to the propulsive direction and the magnitude of a braking force is not controlled.

In Japan, as sea areas to which the Maritime Traffic Safety Act is applied or sea areas to which the Act on Port Regulations is applied, congested waters (Tokyo Bay, Ise Bay, the Seto Inland Sea, and the Kanmon port) and semi-congested waters (from the waters of the entrance of Tokyo Bay, out of Irozaki, the entrance of Ise Bay, out of Shionomisaki, out of Murotomisaki, and out of Ashizurimisaki, which connect the congested waters, to the Seto Inland Sea) are defined.

In these congested waters, traffic flows are complicated. In actual marine traffic in congested waters, ships of different sizes are navigated according to the capacities of the ships. The ships are navigated according to the navigation capabilities of the ships in compliance with marine traffic rules. Since rules cannot be devised for every situation, the marine traffic rules only describe basic principles and thus in many cases, the navigation finally depends upon a determination by a navigator. Thus, criteria for determination in collision-avoidance maneuvering varies among navigators even in the same meeting situation. This may lead to confusion due to a lack of communications. This tendency is accelerated in congested waters.

In a typical method of decelerating a single-propeller single-rudder ship, the main engine is decelerated or stopped to naturally decelerate the ship with a water resistance received by the hull. If the main engine is reversely rotated to forcibly decelerate the ship, it takes a long time to steer the ship, which is not a normal operation in collision avoidance for a single-propeller single-rudder ship. Furthermore, a vessel measuring several hundreds of thousands tons in weight cannot be quickly moved, started, stopped, or turned, thereby increasing the risk of collision.

Hence, ships avoid collision by changing the directions of courses early. In congested waters, however, it is necessary to steer a ship at a short distance from another ship, leading to difficulty in maneuvering ships.

As illustrated in FIG. 8, in ordinary collision-avoidance maneuvering, an own ship 602 is turned to the right in order to avoid a crossing ship (other ship) 601 from the right, moves along a course passing behind the crossing ship, and then is turned to the left to return to an original target course 603.

However, during maneuvering in congested waters as illustrated in FIG. 9, a ship 704 repeatedly turns to the right in order to successively avoid crossing ships (other ships) 701, 702, and 703 from the right; meanwhile, the own ship

704 considerably deviates from an original target course 705, so that the own ship 704 may not head toward a destination.

SUMMARY OF THE INVENTION

The present invention has been devised to solve the problem described above. An object of the present invention is to provide a collision-avoidance maneuvering method in congested waters and a collision-avoidance maneuvering system for a single-propeller twin-rudder ship, which enables collision-avoidance maneuvering at a short distance in a short time by quickly decelerating (braking) a ship with a forcibly controlled braking force without deceleration of a main engine, canceling the deceleration, and then quickly accelerating the ship while keeping the ship on an original course in congested waters.

In order to solve the problem, in a collision-avoidance maneuvering method in congested water according to the present invention, when two ships crossing each other on a course in congested water are likely to collide with each other, the own ship is maneuvered with collision avoidance while viewing the other ship on the starboard side.

In the collision-avoidance maneuvering, the own ship is decelerated so as to avoid collision with the other ship, the own ship being decelerated by astern power against an inertial force applied in the forward direction of the own ship, the own ship being continuously navigated on a current target course with a propulsion propeller always rotated forward at the stern of the own ship, the astern power being generated as the propulsion of a propeller slipstream with rudder angles formed at a pair of right and left high-lift rudders disposed behind the propulsion propeller.

In the decelerating maneuvering, the rudder angles formed at the high-lift rudders are controlled within a range from a rudder angle for applying a maximum propeller slipstream as the astern power to a rudder angle for eliminating the ahead power of the propeller slipstream, and the deceleration of the own ship is controlled by changing the astern power according to the rudder angles.

The rudder angles of the high-lift rudders are controlled so as to continuously navigate the own ship on the target course by using the propulsion of the propeller slipstream as the ahead power after the other ship crosses the course of the own ship.

In the collision-avoidance maneuvering method in congested water according to the present invention, when two ships crossing each other on a course in congested water are likely to collide with each other, the own ship is maneuvered with collision avoidance while viewing the other ship on the starboard side.

In the collision-avoidance maneuvering, the own ship is decelerated so as to avoid collision with the other ship, the own ship being decelerated by astern power against an inertial force applied in the forward direction of the own ship, the own ship being continuously navigated on a current target course with the propulsion propeller always rotated forward at the stern of the own ship, the astern power being generated as the propulsion of a propeller slipstream with rudder angles formed at the pair of right and left high-lift rudders disposed behind the propulsion propeller.

In the decelerating maneuvering, the rudder angles formed at the high-lift rudders are set at a rudder angle for applying the maximum propeller slipstream as the astern power, and the number of revolutions of the propulsion propeller is changed with a constant forward rotation, and the deceleration of the own ship is controlled by changing the astern power according to the number of revolutions of the propeller.

The rudder angles of the high-lift rudders are controlled so as to continuously navigate the own ship on the target course by using the propulsion of the propeller slipstream as the ahead power after the other ship crosses the course of the own ship.

Furthermore, in the decelerating maneuvering, the astern power is controlled according to a distance from the other ship and the speed of the own ship is reduced so as to obtain a time required for the other ship to cross the course of the own ship.

Furthermore, if difficulty arises in reducing the speed of the own ship so as to obtain a time required for the other ship to cross the course of the own ship, the rudder angles formed at the high-lift rudders are controlled within the range of a rudder angle for applying a propeller slipstream as astern power, and a collision is avoided by turning a stern so as to change the moving direction of the own ship while the astern power is applied to reduce the speed of the own ship.

In a collision-avoidance maneuvering system for a single-propeller twin-rudder ship according to the present invention, the single-propeller twin-rudder ship includes a propulsion propeller disposed at the stern of the own ship, a pair of right and left high-lift rudders disposed behind the propulsion propeller, a pair of rotary-vane steering engines for driving the respective high-lift rudders, a steering controller for controlling the direction of a ship motion by combining the rudder angles of the two high-lift rudders, and a ship radar.

In a collision-avoidance maneuvering mode for navigation in congested water, the steering controller performs collision-avoidance maneuvering in response to a collision alarm signal transmitted from the ship radar when the other ship crossing the course of the own ship is likely to collide with the own ship, the own ship being decelerated so as to avoid collision with the other ship by astern power against an inertial force applied in the forward direction of the own ship, the own ship being continuously navigated on a current target course while viewing the other ship on the starboard side with the propulsion propeller always rotated forward, the astern power being generated as the propulsion of a propeller slipstream with rudder angles formed at the high-lift rudders.

In the decelerating maneuvering, the rudder angles formed at the high-lift rudders are controlled within a range from a rudder angle for applying a maximum propeller slipstream as the astern power to a rudder angle for eliminating the ahead power of the propeller slipstream, the astern power that changes with the rudder angle is controlled according to a distance from the other ship, and the speed of the own ship is reduced so as to obtain a time required for the other ship to cross the course of the own ship.

The rudder angles of the high-lift rudders are controlled so as to continuously navigate the own ship on the target course by using the propulsion of the propeller slipstream as the ahead power after the other ship crosses the course of the own ship.

In a collision-avoidance maneuvering system for a single-propeller twin-rudder ship according to the present invention, the single-propeller twin-rudder ship includes a propulsion propeller disposed at the stern of the own ship, a pair of right and left high-lift rudders disposed behind the propulsion propeller, a pair of rotary-vane steering engines for driving the respective high-lift rudders, a steering controller for controlling the direction of a ship motion by combining the rudder angles of the two high-lift rudders, and a ship radar.

In a collision-avoidance maneuvering mode for navigation in congested water, the steering controller performs collision-avoidance maneuvering in response to a collision alarm signal transmitted from the ship radar when the other ship crossing the course of the own ship is likely to collide with the own ship, the own ship being decelerated so as to avoid collision with the other ship by astern power against an inertial force applied in the forward direction of the own ship, the own ship being continuously navigated on a current target course while viewing the other ship on the starboard side with the propulsion propeller always rotated forward, the astern power being generated as the propulsion of a propeller slipstream with rudder angles formed at the high-lift rudders.

In the decelerating maneuvering, the rudder angles formed at the high-lift rudders are set at a rudder angle for applying a maximum propeller slipstream as the astern power, the number of revolutions of the propulsion propeller is changed with a constant forward rotation, the astern power that changes with the number of revolutions of the propeller is controlled according to a distance from the other ship, and the speed of the own ship is reduced so as to obtain a time required for the other ship to cross the course of the own ship.

The rudder angles of the high-lift rudders are controlled so as to continuously navigate the own ship on the target course by using the propulsion of the propeller slipstream as the ahead power after the other ship crosses the course of the own ship.

Furthermore, if the speed of the own ship is unable to decrease so as to obtain a time required for the other ship to cross the course of the own ship, the rudder angles formed at the high-lift rudders are controlled by the steering controller within a range of a rudder angle for applying a propeller slipstream as astern power, and a stern is turned so as to change the moving direction of the own ship while the astern power is applied to reduce the speed of the own ship.

Furthermore, the steering controller controls the rudder angles formed at the high-lift rudders according to a distance relationship with at least one other ship, a relationship between the moving directions of the ships, and a relationship between the relative speeds of the ships.

With this configuration, the decelerating maneuvering is performed while the own ship is continuously navigated on an original target course in congested waters, astern power is applied to the own ship against an inertial force applied in the forward direction of the own ship, and the own ship is decelerated by a forcibly controlled braking force.

In the decelerating maneuvering, the magnitude of the braking force is controlled by changing the astern power according to the rudder angles of the high-lift rudders. Alternatively, the magnitude of a braking force is controlled by changing astern power according to the number of propeller revolutions of the propulsion propeller that rotates in the forward direction.

Forced deceleration (braking) by astern power is performed by controlling a braking force to have any magnitude, so that the speed of the own ship can be reduced so as to avoid the other ship without excessive deceleration. This enables collision-avoidance maneuvering at a short distance in a short time and enables quick acceleration after the deceleration is cancelled.

This can eliminate the need for repeating turns for successively avoiding crossing ships (other ships), allowing an own ship to head toward a destination without deviating from an original target course.

DETAILED DESCRIPTION OF THE INVENTION

Figure 1:
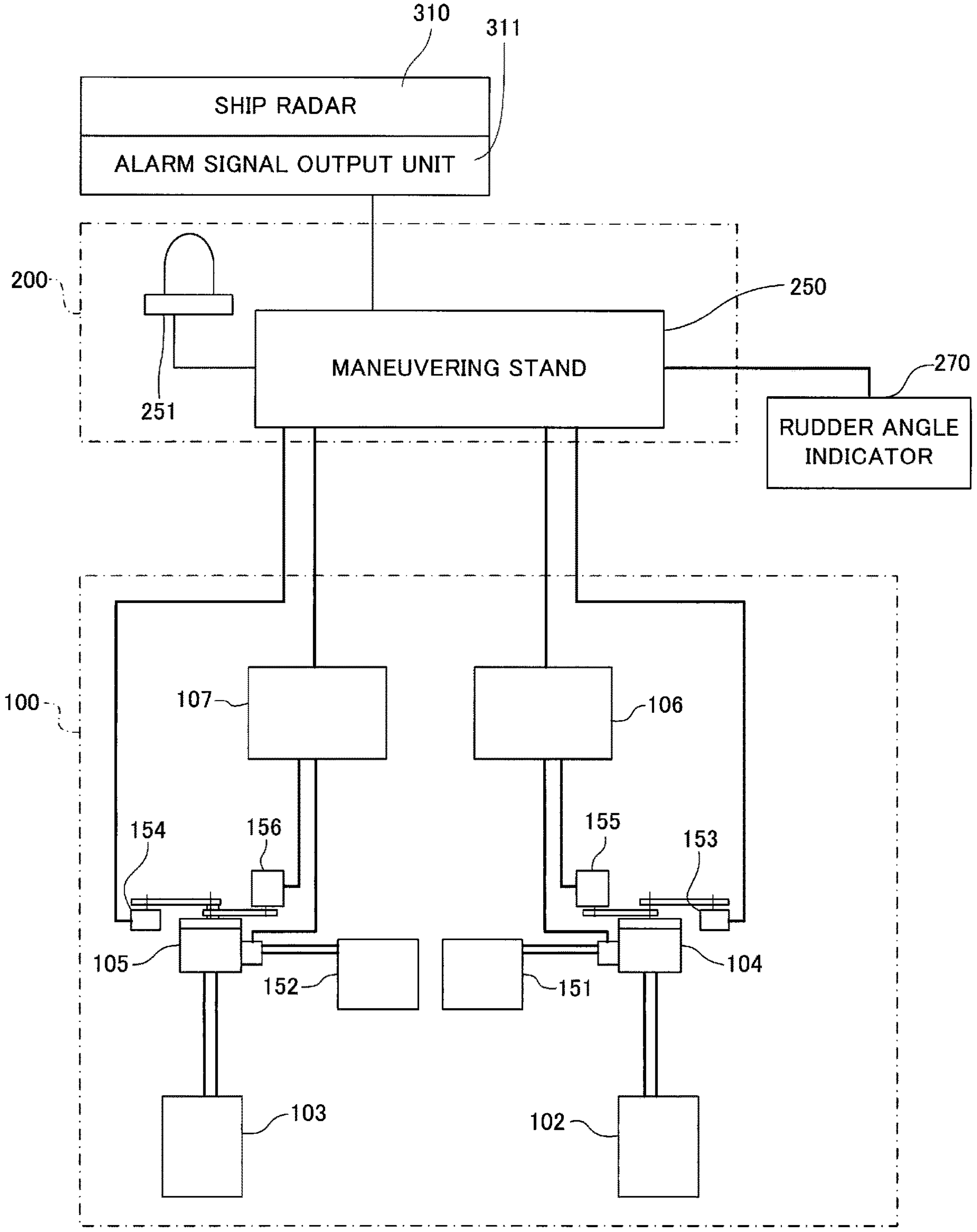
FIG. 1 is a schematic diagram illustrating a propulsion system and a steering controller for a single-propeller twin-rudder ship according to an embodiment of the present invention.
Figure 2:
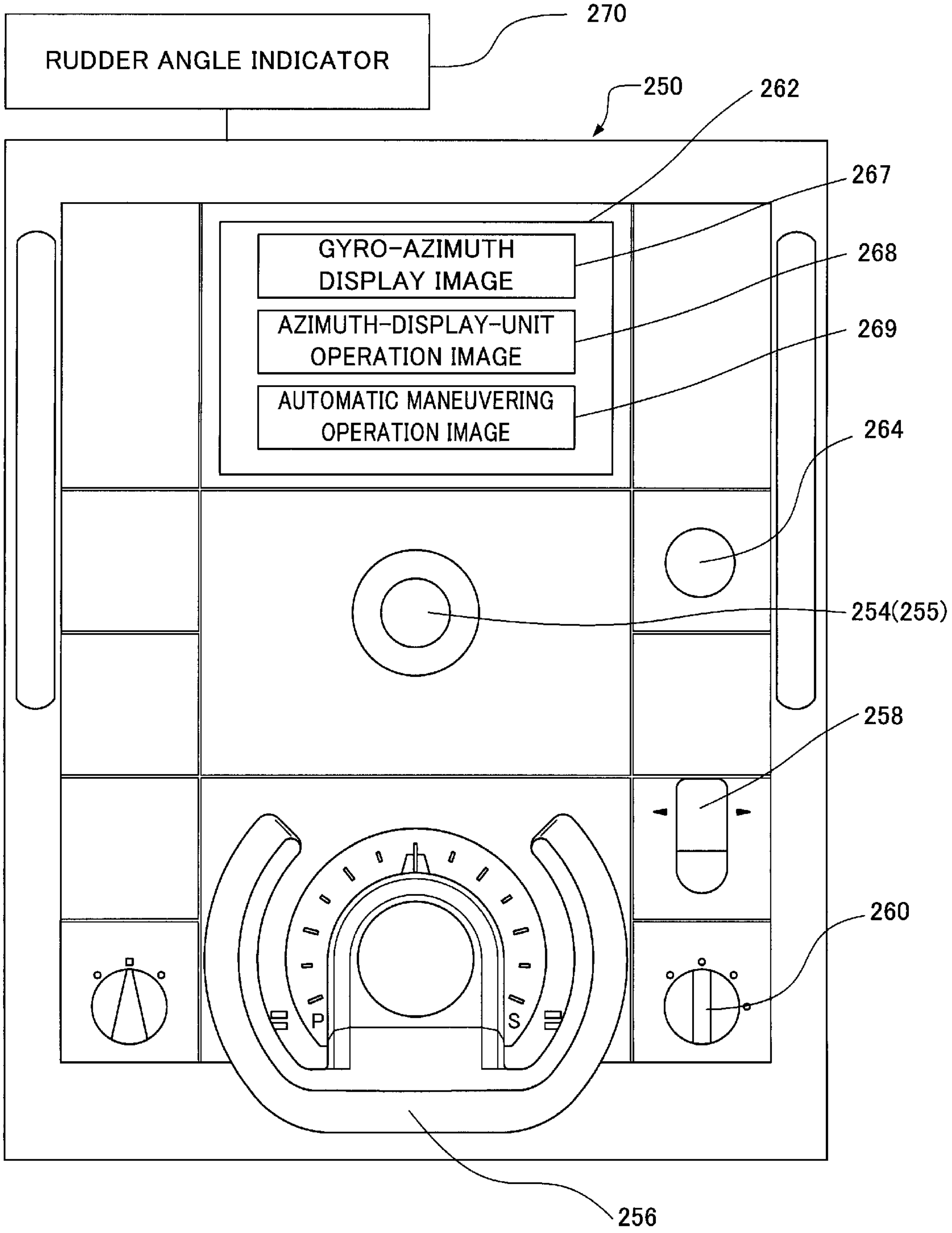
FIG. 2 is a schematic diagram illustrating a maneuvering stand for the steering controller of the single-propeller twin-rudder ship according to the embodiment.
Figure 3:
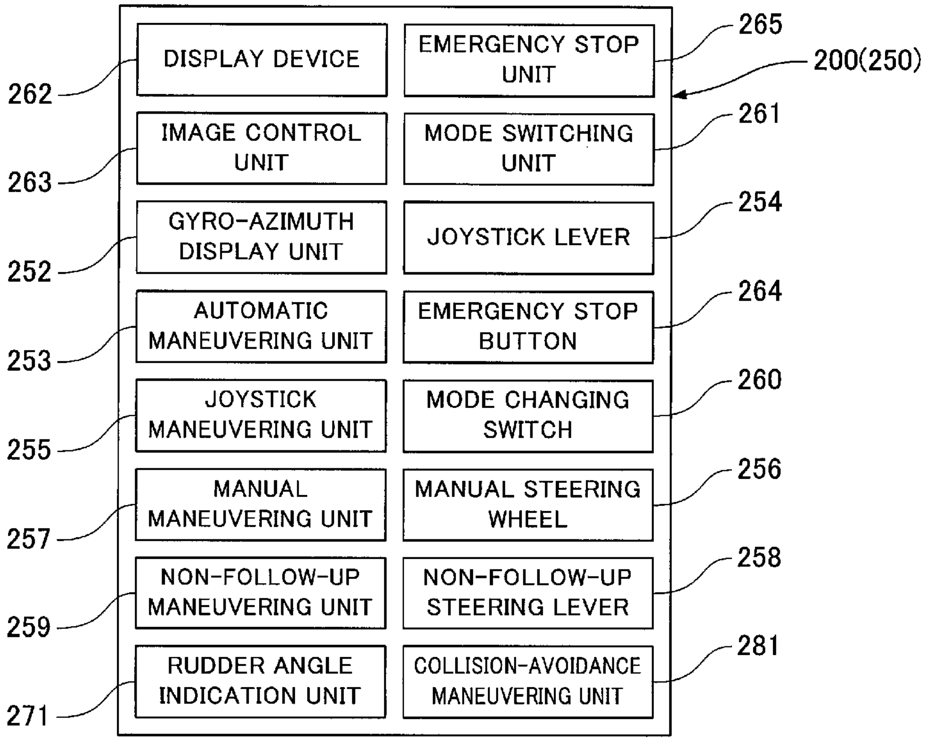
FIG. 3 is a schematic diagram illustrating the configuration of the maneuvering stand according to the embodiment.
Figure 4:
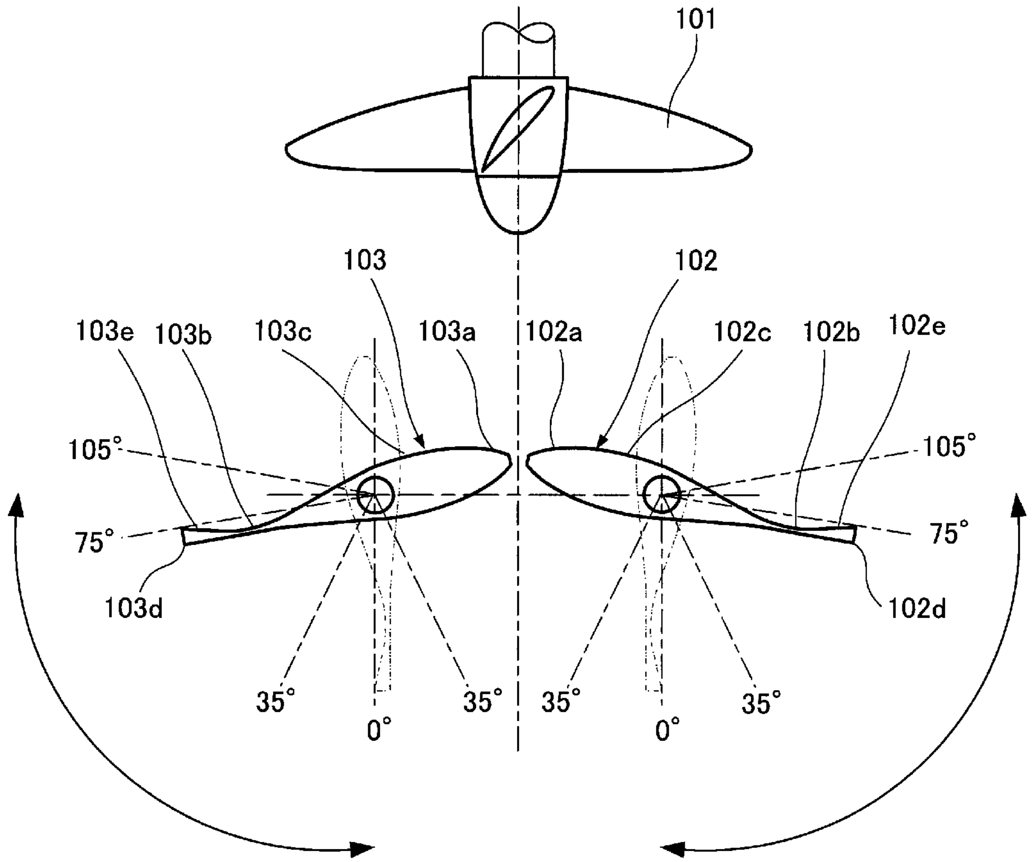
FIG. 4 is a plan view illustrating the motion ranges of high-lift rudders according to the embodiment.
Figure 5:
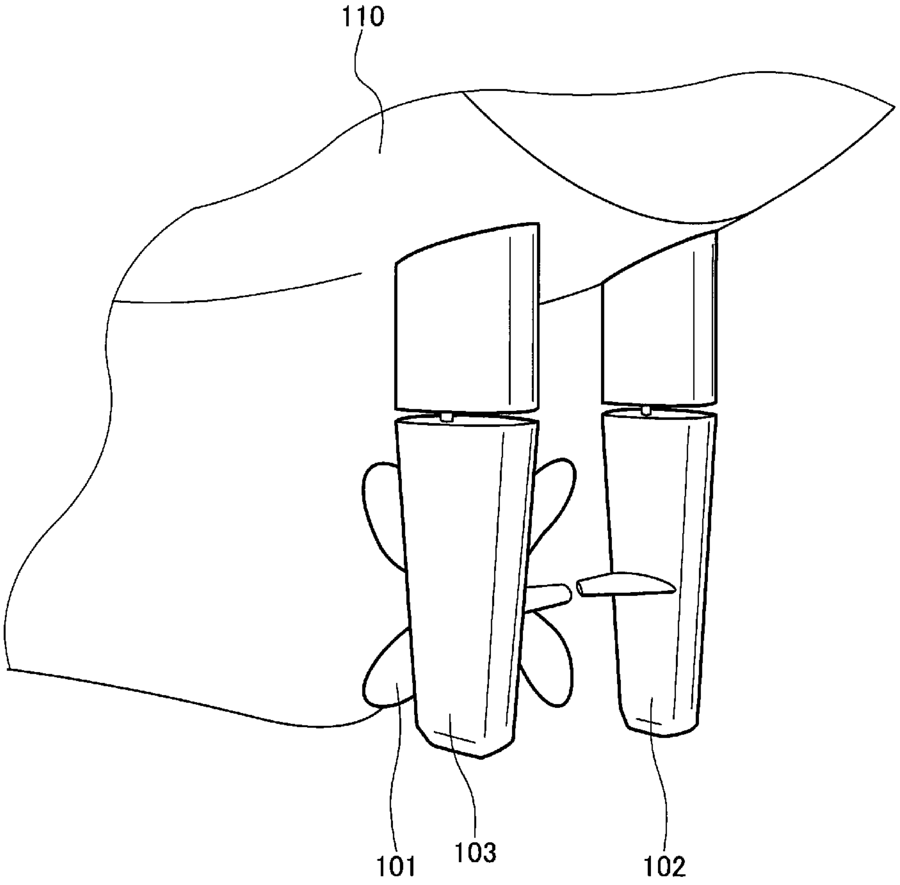
FIG. 5 is a perspective view illustrating a propulsion unit and the high-lift rudders and the configuration of the stern of a propulsion system 100 according to the embodiment.

An embodiment of a steering system according the present invention will be described below in accordance with the accompanying drawings. As illustrated in FIGS. 1 to 6, a twin-rudder steering system according to the present embodiment includes a propulsion system 100 and a maneuvering system (steering controller) 200 for controlling the propulsion system 100.

In the propulsion system 100, a propeller propulsion unit 101 including a propeller of a single-engine, single-shaft type is disposed at the stern of a hull 110 and two high-lift rudders 102 and 103 are disposed behind the propeller.

The high-lift rudders 102 and 103 include rudder blades having high-lift sectional contours in cross section along the axial direction of the propeller. High-lift rudder blades are available in various shapes. The rudder blades of the high-lift rudders 102 and 103 according to the present embodiment are shaped to have front edge parts **102*a* and 103*a* projecting forward in semicircular shapes in the contour of a horizontal section, intermediate parts 102*c* and 103*c* that increase in width into streamlined shapes continuing to the front edge parts 102*a* and 103*a* and gradually decrease in width toward minimum width parts 102*b* and 103*b*, and fishtail rear edge parts 102*e* and 103*e* that continue to the intermediate parts 102*c* and 103*c* and gradually increase in width toward rear ends 102*d* and 103*d*** having predetermined widths.

The high-lift rudders 102 and 103 can be turned outboard (to the outside) by 105° and can be turned inboard (to the inside) by 35°. The high-lift rudders 102 and 103 can be independently operated at various angles.

The rudder angles of the two high-lift rudders 102 and 103 are changed while the propeller of the single-engine and single-shaft propulsion unit rotates in the forward direction. This can distribute a propeller slipstream in a desired target direction so as to freely change the direction of propulsion.

Furthermore, propulsion around the stern is controlled in all direction by controlling the propeller slipstream, allowing a ship to move ahead and astern, stop, turn forward, or turn astern, thereby freely controlling a movement of the ship.

The propulsion system 100 further includes rotary-vane steering engines 104 and 105 for driving the high-lift rudders 102 and 103 and rudder controllers (servo amplifiers) 106 and 107 for controlling the rotary-vane steering engines 104 and 105.

Moreover, pump units 151 and 152, rudder angle transmitters 153 and 154, and feedback units 155 and 156 are connected to the rotary-vane steering engines 104 and 105. The feedback units 155 and 156 are connected to the rudder controllers 106 and 107.

A maneuvering system (steering controller) 200 is stored in a maneuvering stand 250. A gyrocompass 251 and a ship radar 310 are connected to the maneuvering stand 250. When a collision with another ship is predicted, the ship radar 310 transmits a collision alarm signal from an alarm signal output unit 311 to the maneuvering system (steering controller) 200 of the maneuvering stand 250.

The maneuvering stand 250 includes, in a stand cabinet, a combination of a gyro-azimuth display unit 252 that displays the gyro azimuth of the gyrocompass 251, an automatic maneuvering unit 253 for maneuvering in an operation mode using an autopilot with a GPS compass, a joystick maneuvering unit 255 for maneuvering in an operation mode using a joystick lever 254, a manual maneuvering unit 257 for maneuvering in an operation mode using a manual steering wheel 256, a non-follow-up maneuvering unit 259 for maneuvering in an operation mode using a non-follow-up steering lever 258, a mode switching unit 261 that switches the maneuvering units by means of a mode changing switch 260, a display device 262 including a touch panel on the screen, an image control unit 263 that controls an image on the display device 262, an emergency stop unit 265 that stops a ship in an operation mode for urgently stopping the ship prior to all the operation modes by operating an emergency stop button 264, a collision-avoidance maneuvering unit 281 for maneuvering in a collision-avoidance maneuvering operation mode when two ships crossing a course may collide with each other during navigation in congested waters, and a rudder angle indication unit 271 that controls a rudder angle indicator 270 for displaying the current rudder angles of the high-lift rudders 102 and 103.

The image control unit 263 selectively or simultaneously displays a gyro-azimuth display image 267 indicating a gyro azimuth, an azimuth-display-unit operation image 268 for touching the gyro-azimuth display unit 252 on a monitor screen, and an automatic maneuvering operation image 269 for touching the automatic maneuvering unit 253 on the monitor screen.

The joystick maneuvering unit 255 is configured so as to operate the joystick lever 254 in either of X and Y directions. The command motion direction of the hull is controlled by the inclination direction of the joystick lever 254, and a fore-and-aft direction command speed and a hull-lateral-direction command speed are controlled by the angle of inclination in the inclination direction.

The joystick maneuvering unit 255 controls the rudder angles of the high-lift rudders 102 and 103 on both sides according to the inclination direction of the joystick lever 254. The rudder angles of the high-lift rudders 102 and 103 on both sides are combined to turn the propulsion of a propeller slipstream to a target direction. The rudder angles of the high-lift rudders 102 and 103 on both sides are controlled up to 105° on the outside and up to 35° on the inside by the rotary-vane steering engines 104 and 105.

Figure 6:
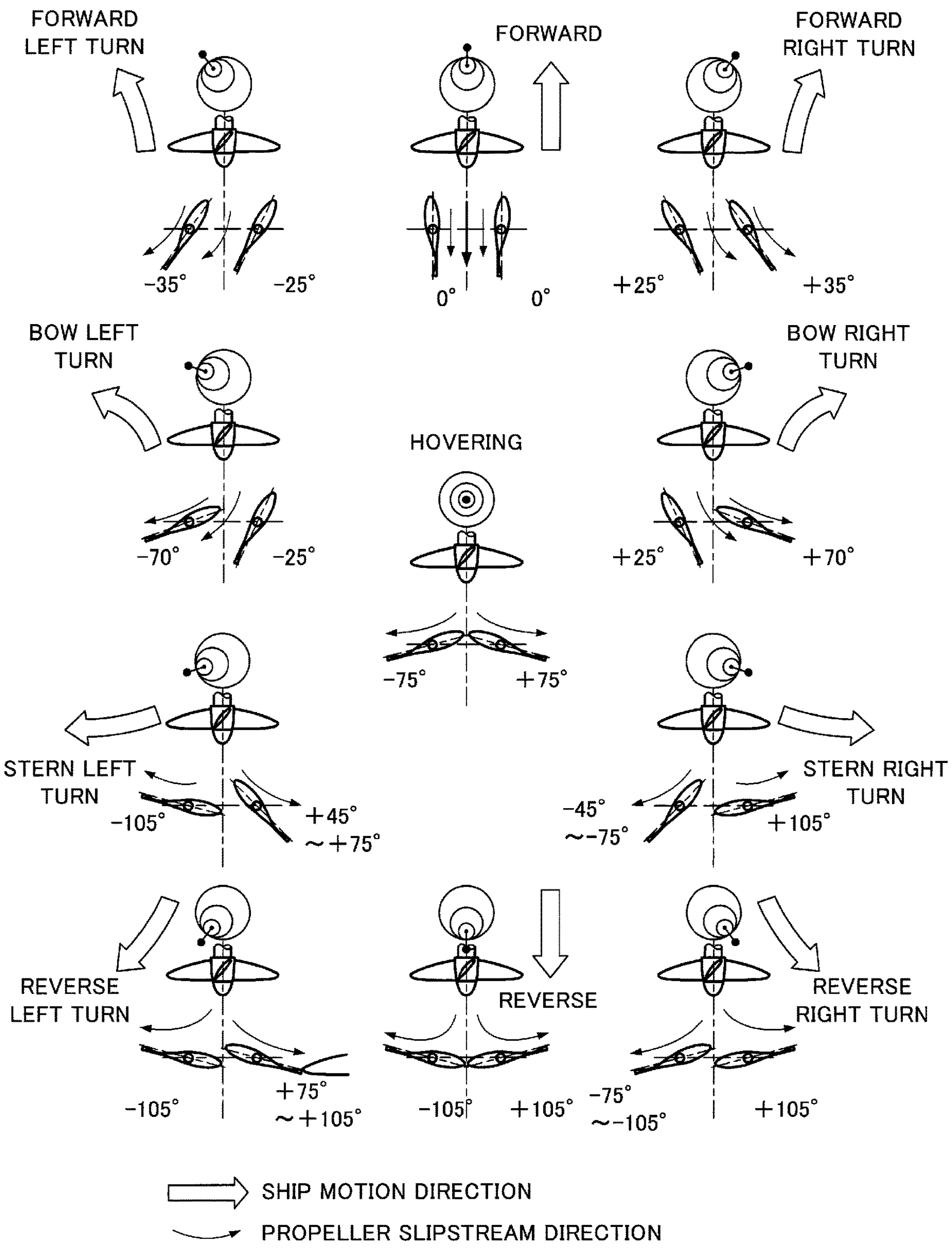
FIG. 6 is a schematic diagram illustrating the combined rudder angles and turning directions of the rudders.

Referring to FIG. 6, combinations of basic rudder angles of the high-lift rudders 102 and 103, the states of the joystick lever 254, the designations of the combinations and the states, and the directions of propeller slipstream lines and motions will be described below.

In FIG. 6, the rudders are illustrated in horizontal cross section and the rudder angles of the rudders are indicated beside or below the rudders. The rudder angles of right courses are indicated as positive (+) angles and the rudder angles of left courses are indicated as negative (−) angles. The designations of the combinations of the rudder angles are indicated. The propeller slipstreams are indicated by thin arrow lines and the propulsive directions of the ship moved by the slipstreams are indicated by thick and blank arrow lines.

Specifically, "forward left turn" indicates the port rudder at −35° and the starboard rudder at −25°, "bow left turn" indicates the port rudder at −70° and the starboard rudder at −25°, "stern left turn" indicates the port rudder at −105° and the starboard rudder at +45° to +75°, "reverse left turn" indicates the port rudder at −105° and the starboard rudder at +75° to +105°, "forward" indicates the port rudder at 0° and the starboard rudder at 0°, "hovering" indicates the port rudder at −75° and the starboard rudder at +75°, "reverse" indicates the port rudder at −105° and the starboard rudder at +105°, "forward turn right" indicates the port rudder at +25° and the starboard rudder at +35°, "bow right turn" indicates the port rudder at +25° and the starboard rudder at +70°, "stern right turn" indicates the port rudder at −45° to −75° and the starboard rudder at +105°, and "reverse right turn" indicates the port rudder at −75° to −105° and the starboard rudder at +105°.

The single-propeller twin-rudder ship including the two high-lift rudders 102 and 103 can freely change and output the direction and magnitude of propulsion in all the directions of the ship by changing the combined rudder angles of the high-lift rudders 102 and 103.

The automatic maneuvering unit 253 guides and controls the own ship to a predetermined course based on a GPS compass, current position information on the own ship based on an electronic marine chart system, guidance route information, and stopped-ship retaining position information.

When an emergency stop button 264 is pressed in emergency, the emergency stop unit 265 cancels the rudder angles of current maneuvering in any maneuvering state indicated by the joystick lever 254 or in maneuvering in any other operation modes. The emergency stop unit 265 then turns the port rudder 103 to port (clockwise in top view) and the starboard rudder 102 to starboard (counterclockwise in top view) to hardover (full), so that the ship is stopped by an applied braking force.

The manual maneuvering unit 257 is provided for maneuvering the ship while controlling the rudder angles of the two high-lift rudders 102 and 103 by rotating the manual steering wheel 256.

The non-follow-up maneuvering unit 259 turns the ship to starboard or port according to a time for laterally operating the non-follow-up steering lever 258.

The collision-avoidance maneuvering unit 281 performs collision-avoidance maneuvering by automatically controlling a propulsive direction or a ship speed according to a current situation based on position information on an own ship 501 and one or more other ships 401 and 402, the position information being obtained from the gyrocompass 251 and the ship radar 310, azimuth information on the own ship 501 and the other ships 401 and 402, distance information on the other ships 401 and 402, and relative speed information on the other ships 401 and 402.

Figure 7:
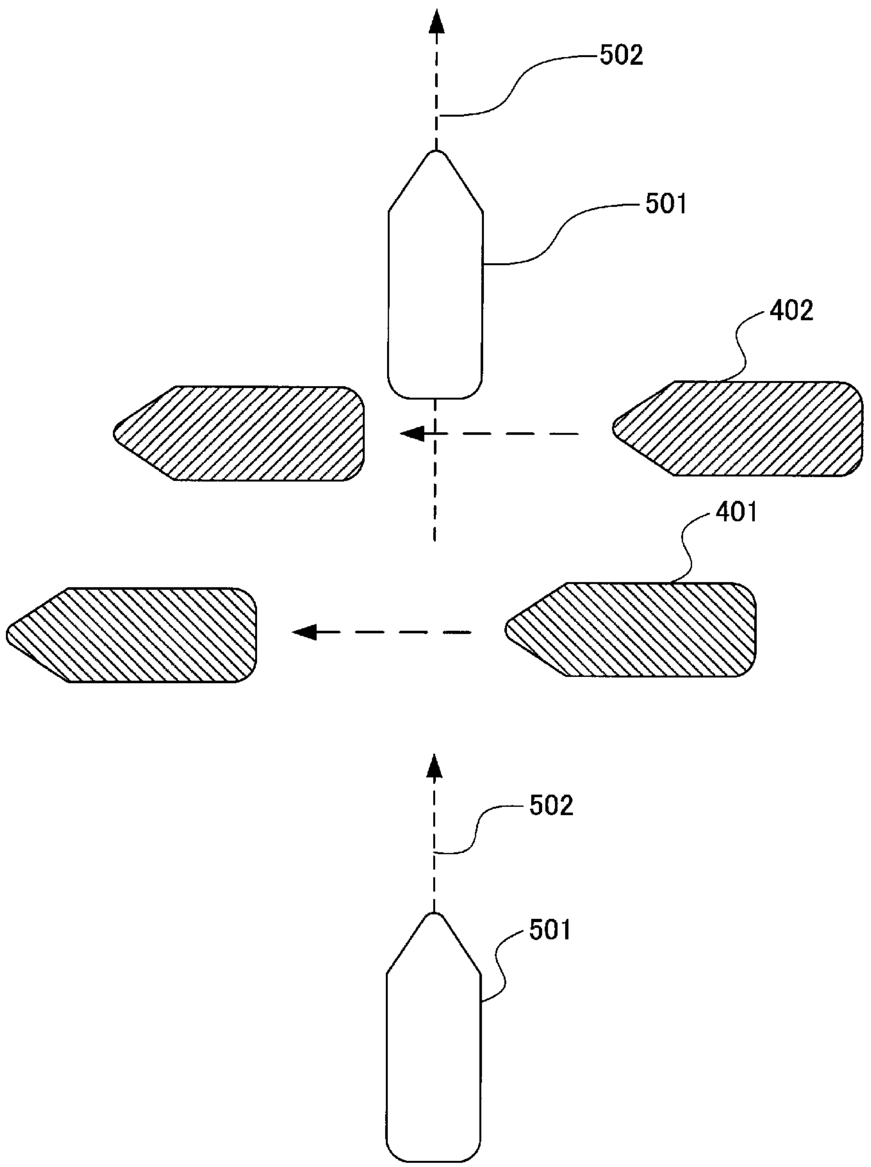
FIG. 7 is a schematic diagram illustrating collision-avoidance maneuvering according to the embodiment.
Figure 8:
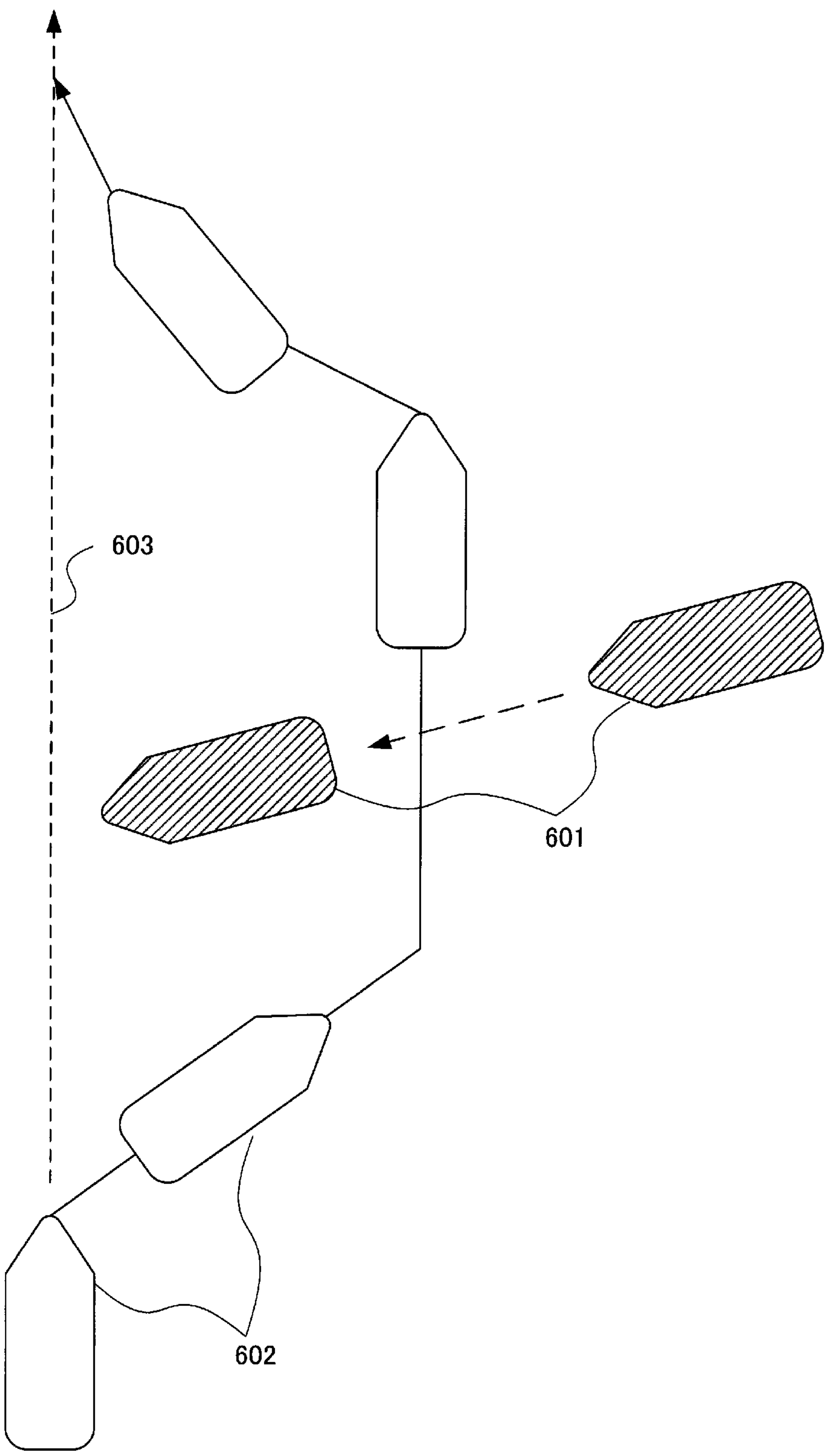
FIG. 8 is a schematic diagram illustrating conventional collision-avoidance maneuvering.
Figure 9:
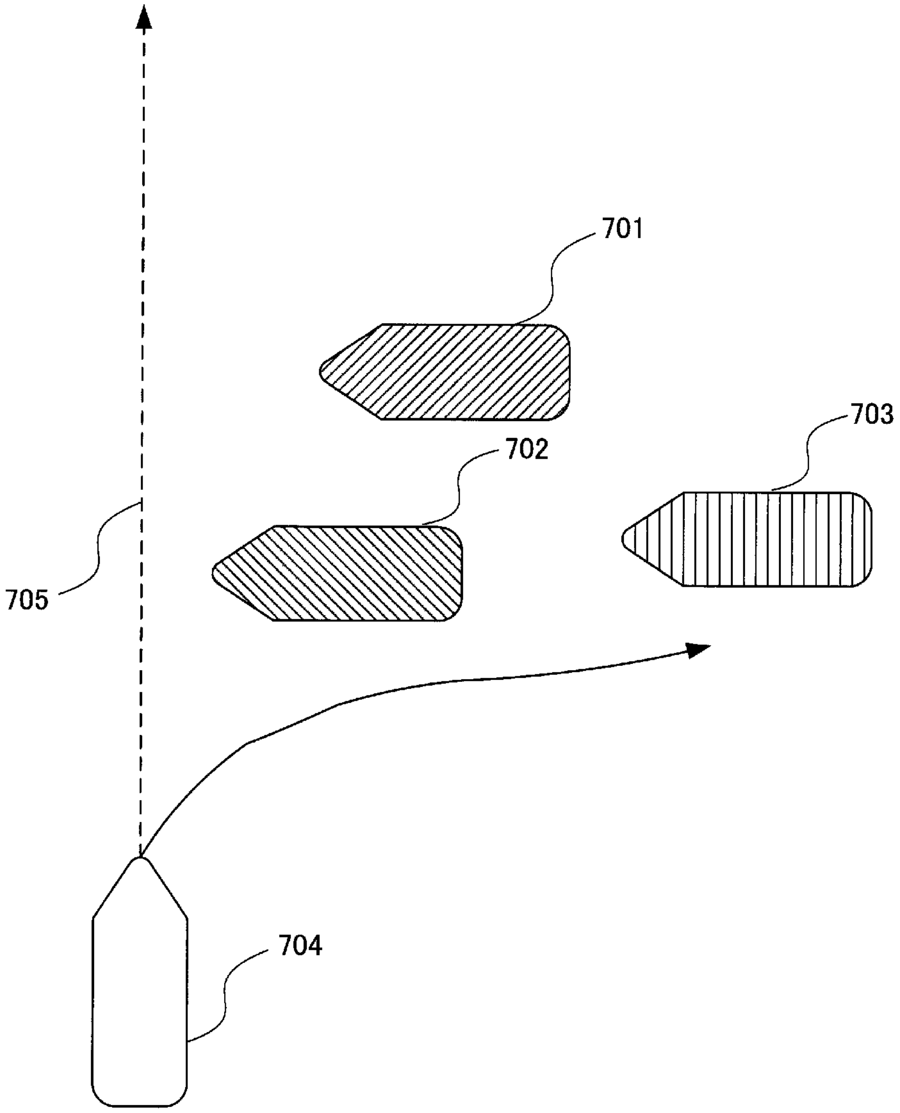
FIG. 9 is a schematic diagram illustrating conventional collision-avoidance maneuvering in congested waters.

Specifically, as illustrated in FIG. 7, the collision-avoidance maneuvering unit 281 performs collision-avoidance maneuvering in response to the collision alarm signal transmitted from the ship radar 310 if the other ships 401 and 402 crossing a target course 502 of the own ship 501 may collide with the own ship 501 in a maneuvering mode of collision-avoidance maneuvering for navigation in congested waters.

In collision-avoidance maneuvering, the own ship 501 is continuously navigated on the current target course 502 while viewing the other ships 401 and 402 on the starboard side. The propulsion propeller 101 is always rotated forward. Furthermore, rudder angles are formed at the high-lift rudders 102 and 103 and the propulsion of a propeller slipstream acts as astern power. The astern power is then applied as a braking force. The braking force decelerates the own ship 501 against an inertial force applied in the forward direction of the own ship 501, thereby avoiding a collision with the other ships 401 and 402.

Rudder angles formed by the collision-avoidance maneuvering unit 281 at the high-lift rudders 102 and 103 range from a rudder angle for applying a maximum propeller slipstream as astern power to a rudder angle for eliminating the ahead power of a propeller slipstream. While the propulsion propeller 101 keeps a constant forward rotation, the braking force is controlled by increasing or reducing the astern power according to the rudder angles. The braking force is controlled according to a distance from the other ships 401 and 402 and reduces the speed of the own ship 501 so as to obtain a time required for the other ships 401 and 402 crossing the target course 502 of the own ship 501.

As has been discussed, if the rudder angles of right courses are indicated as positive (+) angles and the rudder angles of left courses are indicated as negative (−) angles, the starboard rudder 102 ranges from +75° to +105° and the port rudder 103 ranges from −75° to −105°.

In "reverse", rudder angles for applying the maximum propeller slipstream as astern power are +105° for the starboard rudder 102 and −105° for the port rudder 103. In "hovering", rudder angles for eliminating ahead power of a propeller slipstream are −75° for the port rudder and +75° for the starboard rudder. These rudder angles do not cause active astern power but contribute to deceleration of the own ship 501 by the resistances of the high-lift rudders 102 and 103 against an inertial force applied in the forward direction of the own ship 501.

Subsequently, the other ships 401 and 402 cross the target course 502 of the own ship 501 and then the rudder angles of the high-lift rudders 102 and 103 are controlled so as to continuously navigate the own ship 501 on the target course 502 by using the propulsion of a propeller slipstream as ahead power.

In the present embodiment, the high-lift rudders 102 and 103 are turned within a certain range during deceleration. The ship can be also maneuvered as follows:

Specifically, the collision-avoidance maneuvering unit 281 sets the rudder angles of the high-lift rudders at the rudder angles for applying the maximum propeller slipstream as astern power, that is, +105° for the starboard rudder 102 and −105° for the port rudder 103. Subsequently, a braking force applied by astern power is controlled by increasing or reducing the number of revolutions of the propulsion propeller 101 rotating forward. The braking force is controlled according to a distance from the other ships 401 and 402 and reduces the speed of the own ship 501 so as to obtain a time required for the other ships 401 and 402 crossing the target course 502 of the own ship 501.

The operations of the configuration will be described below.

1. An Operation Mode by the Joystick

The mode changing switch 260 is operated to select an operation mode by the joystick. The joystick maneuvering unit 255 issues the commands of the command motion direction of the hull, fore-and-aft direction command propulsion, and the lateral command propulsion of the hull by using the joystick lever 254.

In the maneuvering, the propeller propulsion unit 101 is rotated forward and the high-lift rudders 102 and 103 are independently operated at various angles so as to control the distribution of a propeller slipstream, thereby controlling propulsion around the stern in all directions. Under this control, the ship can be maneuvered forward and backward, stopped, turned forward, and turned backward, thereby improving maneuverability.

In other words, by changing the combinations of the rudder angles of the high-lift rudders 102 and 103, a propeller slipstream can be turned in a desired target direction so as to change the direction of propulsion. The combinations of rudder angles in the present embodiment are merely exemplary and can be optionally changed to obtain a target propulsion direction and propulsion.

As has been discussed, the operation mode by the joystick does not require a reversal of the propulsion of the propulsion unit (a backward rotation of the propeller), achieving any maneuvering control with the main engine always rotated forward. In other words, without increasing or reducing the number of revolutions of the main engine, the rudder angles of the rudders are adjusted so as to minutely control the speed of the ship in a continuous manner from a maximum ahead speed to a maximum astern speed according to the number of revolution of the propeller at that time.

2. An Operation Mode by the Emergency Stop Unit

An action to press the emergency stop button 264 starts the emergency stop unit 265, thereby urgently stopping the ship prior to all the operation modes. Specifically, regardless of the operation mode of the joystick lever 254 or other operation modes, the emergency stop unit 265 switches the mode to a crush astern mode ("ASTERN" in which the port rudder to 105° aport and the starboard rudder to 105° astarboard). Since the rudders generate quite a large braking force and astern power, the ship can be stopped in a much shorter time with a much shorter distance than in maneuvering with a backward rotation of the propeller.

Also in the crush astern mode, it is not necessary to stop the main engine and restart reversing. Thus, the ship is not brought into an uncontrolled state, enabling quick response to situations in navigation.

If the ship is turned by the characteristics of the ship or disturbance during maneuvering by the emergency stop unit 265 or if the moving direction, e.g., heading is to be changed as required, an operation of the joystick lever 254 enables collision avoidance while freely maneuvering the ship with the joystick lever 254 as in an ordinary joystick operation.

3. An Autopilot Operation Mode

In normal navigation, the mode changing switch 260 is operated to select an autopilot operation mode.

The automatic maneuvering operation image 269 is displayed on the monitor screen of the display device 262, the position of the own ship, a target azimuth, a destination position, or a fore-and-aft line azimuth is inputted to the automatic maneuvering unit 253 by touching the monitor screen, and the own ship is maneuvered according to a set course by automatic guidance. The automatic maneuvering unit 253 properly controls rudder angles based on current position information on the own ship, guidance route information, and stopped-ship retaining position information.

4. A Manual Operation Mode

The mode changing switch 260 is operated to select an operation mode by the manual steering wheel 256. In this operation mode, the manual steering wheel 256 is rotated to instruct the manual maneuvering unit 257 about the rudder angles of the two high-lift rudders 102 and 103, and the rudder angles of the two high-lift rudders 102 and 103 are controlled to maneuver the ship.

5. A Non-Follow-Up Operation Mode

The mode changing switch 260 is operated to select an operation mode by the non-follow-up steering lever 258. In this operation mode, the non-follow-up maneuvering unit 259 turns the ship to starboard or port according to a time for laterally operating the non-follow-up steering lever 258.

6. A Collision-Avoidance Maneuvering Mode

In navigation in congested waters, the mode changing switch 260 is operated to select an operation mode by the collision-avoidance maneuvering unit 281.

In the collision-avoidance maneuvering mode for navigation in congested waters, the collision-avoidance maneuvering unit 281 performs collision-avoidance maneuvering in response to the collision alarm signal transmitted from the ship radar 310 when other ships crossing the course of the own ship may collide with the own ship.

Specifically, as illustrated in FIG. 7, the own ship 501 is continuously navigated on the current target course 502 while viewing the other ships 401 and 402 on the starboard side; meanwhile, the propulsion propeller 101 is always rotated forward, rudder angles are formed at the high-lift rudders 102 and 103, and the propulsion of a propeller slipstream acts as astern power, which generates a braking force. The braking force decelerates the own ship 501 against an inertial force applied in the forward direction of the own ship 501, thereby avoiding a collision with the other ships 401 and 402.

In this case, while the propulsion propeller 101 keeps a constant forward rotation, rudder angles formed at the high-lift rudders 102 and 103 are controlled within a range from the rudder angle for applying the maximum propeller slipstream as astern power to the rudder angle for eliminating the ahead power of a propeller slipstream. Furthermore, the astern power that increases or decreases with the rudder angle is controlled according to a distance from the other ships 401 and 402, and the controlled braking force reduces the speed of the own ship 501 so as to obtain a time required for the other ships 401 and 402 crossing the target course 502 of the own ship 501.

Subsequently, the other ships 401 and 402 cross the target course 502 of the own ship 501 and then the rudder angles of the high-lift rudders 102 and 103 are controlled so as to continuously navigate the own ship 501 on the target course 502 by using the propulsion of a propeller slipstream as ahead power.

Alternatively, the rudder angles formed at the high-lift rudders are set at the rudder angles for applying the maximum propeller slipstream as astern power, that is, +105° for the starboard rudder 102 and −105° for the port rudder 103, and the number of revolutions of propulsion propeller 101 rotating forward is increased or reduced. Furthermore, the astern power that increases or decreases with the number of revolutions of the propeller is controlled according to a distance from the other ships 401 and 402, and the controlled braking force reduces the speed of the own ship 501 so as to obtain a time required for the other ships 401 and 402 crossing the target course 502 of the own ship 501.

Subsequently, the other ships 401 and 402 cross the target course 502 of the own ship 501 and then the rudder angles of the high-lift rudders 102 and 103 are controlled so as to continuously navigate the own ship 501 on the target course 502 by using the propulsion of a propeller slipstream as ahead power.

Moreover, if the speed of the own ship 501 cannot be reduced so as to obtain a time required for the other ships 401 and 402 crossing the target course 502 of the own ship 501 also in "reverse" (the port rudder at −105° and the starboard rudder at +105°), that is, if the own ship 501 moving ahead by an inertial force is highly likely to collide with the other ships 401 and 402, the collision-avoidance maneuvering unit 281 performs the following operations:

The rudder angles formed at the high-lift rudders 102 and 103 are controlled within the range of a rudder angle for applying a propeller slipstream as astern power, that is, within the range of "stern left turn" (the port rudder at −105° and the starboard rudder at +45° to +75°), "reverse left turn" (the port rudder at −105° and the starboard rudder at +75° to +105°), "stern right turn" (the port rudder at −45° to −75° and the starboard rudder at +105°), and "reverse right turn" (the port rudder at −75° to −105° and the starboard rudder at +105°).

In the maneuvering, the ship is moved ahead by an inertial force. The speed of the ship is gradually reduced by the action of astern power, a lateral force is generated for the combination of the rudder angles of the high-lift rudders 102 and 103, and then the stern is turned to change the moving direction of the own ship.

As has been discussed, in a tense situation where collision with the other ships 401 and 402 is to be avoided, the ship is maneuvered by selecting the combinations of rudder angles in the astern direction and combining deceleration and a course change by turning of the stern.

What is claimed is:

1. A collision-avoidance maneuvering method in congested water, in which when two ships crossing each other on a course in congested water are likely to collide with each other, an own ship is maneuvered with collision avoidance while viewing another ship on a starboard side, the method comprising the steps of:

maneuvering the own ship decelerated so as to avoid collision with the other ship, the own ship being decelerated by astern power against an inertial force applied in a forward direction of the own ship, the own ship being continuously navigated on a current target course with a propulsion propeller always rotated forward at a stern of the own ship, the astern power being generated as propulsion of a propeller slipstream with rudder angles formed at a pair of right and left high-lift rudders disposed behind the propulsion propeller;

controlling, in the decelerating maneuvering, the rudder angles formed at the high-lift rudders within a range from a rudder angle for applying a maximum propeller slipstream as the astern power to a rudder angle for eliminating ahead power of the propeller slipstream, and controlling the deceleration of the own ship by changing the astern power according to the rudder angles; and controlling the rudder angles of the high-lift rudders so as to continuously navigate the own ship on the target course by using the propulsion of the propeller slipstream as the ahead power after the other ship crosses the course of the own ship.

2. A collision-avoidance maneuvering method in congested water, in which when two ships crossing each other on a course in congested water are likely to collide with each other, an own ship is maneuvered with collision avoidance while viewing another ship on a starboard side, the method comprising the steps of:

maneuvering the own ship decelerated so as to avoid collision with the other ship, the own ship being decelerated by astern power against an inertial force applied in a forward direction of the own ship, the own ship being continuously navigated on a current target course with a propulsion propeller always rotated forward at a stern of the own ship, the astern power being generated as propulsion of a propeller slipstream with rudder angles formed at a pair of right and left high-lift rudders disposed behind the propulsion propeller;

setting, in the decelerating maneuvering, the rudder angles formed at the high-lift rudders at a rudder angle for applying a maximum propeller slipstream as the astern power, and changing a number of revolutions of the propulsion propeller with a constant forward rotation, and controlling the deceleration of the own ship by changing the astern power according to the number of revolutions of the propeller; and controlling the rudder angles of the high-lift rudders so as to continuously navigate the own ship on the target course by using the propulsion of the propeller slipstream as the ahead power after the other ship crosses the course of the own ship.

3. The collision-avoidance maneuvering method in congested water according to claim 1, wherein in the decelerating maneuvering, the astern power is controlled according to a distance from the other ship and a speed of the own ship is reduced so as to obtain a time required for the other ship to cross the course of the own ship.

4. The collision-avoidance maneuvering method in congested water according to claim 1, wherein if difficulty arises in reducing a speed of the own ship so as to obtain a time required for the other ship to cross the course of the own ship, the rudder angles formed at the high-lift rudders are controlled within a range of a rudder angle for applying a propeller slipstream as astern power, and a collision is avoided by turning a stern so as to change a moving direction of the own ship while the astern power is applied to reduce the speed of the own ship.

5. A collision-avoidance maneuvering system for a single-propeller twin-rudder ship, the single-propeller twin-rudder ship comprising a propulsion propeller disposed at a stern of the ship, a pair of right and left high-lift rudders disposed behind the propulsion propeller, a pair of rotary-vane steering engines for driving the respective high-lift rudders, a steering controller for controlling a direction of a ship motion by combining rudder angles of the two high-lift rudders, and a ship radar, wherein in a collision-avoidance maneuvering mode for navigation in congested water, the steering controller performs collision-avoidance maneuvering in response to a collision alarm signal transmitted from the ship radar when another ship crossing a course of an own ship is likely to collide with the own ship, the own ship being decelerated so as to avoid collision with the other ship by astern power against an inertial force applied in a forward direction of the own ship, the own ship being continuously navigated on a current target course while viewing the other ship on a starboard side with the propulsion propeller always rotated forward, the astern power being generated as propulsion of a propeller slipstream with rudder angles formed at the high-lift rudders, in the decelerating maneuvering, the rudder angles formed at the high-lift rudders are controlled within a range from a rudder angle for applying a maximum propeller slipstream as the astern power to a rudder angle for eliminating the ahead power of the propeller slipstream, the astern power that changes with the rudder angle is controlled according to a distance from the other ship, and the speed of the own ship is reduced so as to obtain a time required for the other ship to cross the course of the own ship, and the rudder angles of the high-lift rudders are controlled so as to continuously navigate the own ship on the target course by using the propulsion of the propeller slipstream as the ahead power after the other ship crosses the course of the own ship.

6. A collision-avoidance maneuvering system for a single-propeller twin-rudder ship, the single-propeller twin-rudder ship comprising a propulsion propeller disposed at a stern of an own ship, a pair of right and left high-lift rudders disposed behind the propulsion propeller, a pair of rotary-vane steering engines for driving the respective high-lift rudders, a steering controller for controlling a direction of a ship motion by combining rudder angles of the two high-lift rudders, and a ship radar, wherein in a collision-avoidance maneuvering mode for navigation in congested water, the steering controller performs collision-avoidance maneuvering in response to a collision alarm signal transmitted from the ship radar when another ship crossing a course of the own ship is likely to collide with the own ship, the own ship being decelerated so as to avoid collision with the other ship by astern power against an inertial force applied in a forward direction of the own ship, the own ship being continuously navigated on a current target course while viewing the other ship on a starboard side with the propulsion propeller always rotated forward, the astern power being generated as propulsion of a propeller slipstream with rudder angles formed at the high-lift rudders, in the decelerating maneuvering, the rudder angles formed at the high-lift rudders are set at a rudder angle for applying a maximum propeller slipstream as the astern power, a number of revolutions of the propulsion propeller is changed with a constant forward rotation, the astern power that changes with the number of revolutions of the propeller is controlled according to a distance from the other ship, and a speed of the own ship is reduced so as to obtain a time required for the other ship to cross the course of the own ship, and the rudder angles of the high-lift rudders are controlled so as to continuously navigate the own ship on the target course by using the propulsion of the propeller slipstream as the ahead power after the other ship crosses the course of the own ship.

7. The collision-avoidance maneuvering system for a single-propeller twin-rudder ship according to claim 5, wherein if the speed of the own ship is unable to decrease so as to obtain a time required for the other ship to cross the course of the own ship, the rudder angles formed at the high-lift rudders are controlled by the steering controller within a range of a rudder angle for applying a propeller slipstream as astern power, and a stern is turned so as to change a moving direction of the own ship while the astern power is applied to reduce the speed of the own ship.

8. The collision-avoidance maneuvering system for a single-propeller twin-rudder ship according to claim 5, wherein the steering controller controls the rudder angles formed at the high-lift rudders according to a distance relationship with at least one other ship, a relationship between moving directions of the ships, and a relationship between relative speeds of the ships.

9. The collision-avoidance maneuvering method in congested water according to claim 2, wherein in the decelerating maneuvering, the astern power is controlled according to a distance from the other ship and a speed of the own ship is reduced so as to obtain a time required for the other ship to cross the course of the own ship.

* * * * *